UNITED STATES PATENT OFFICE.

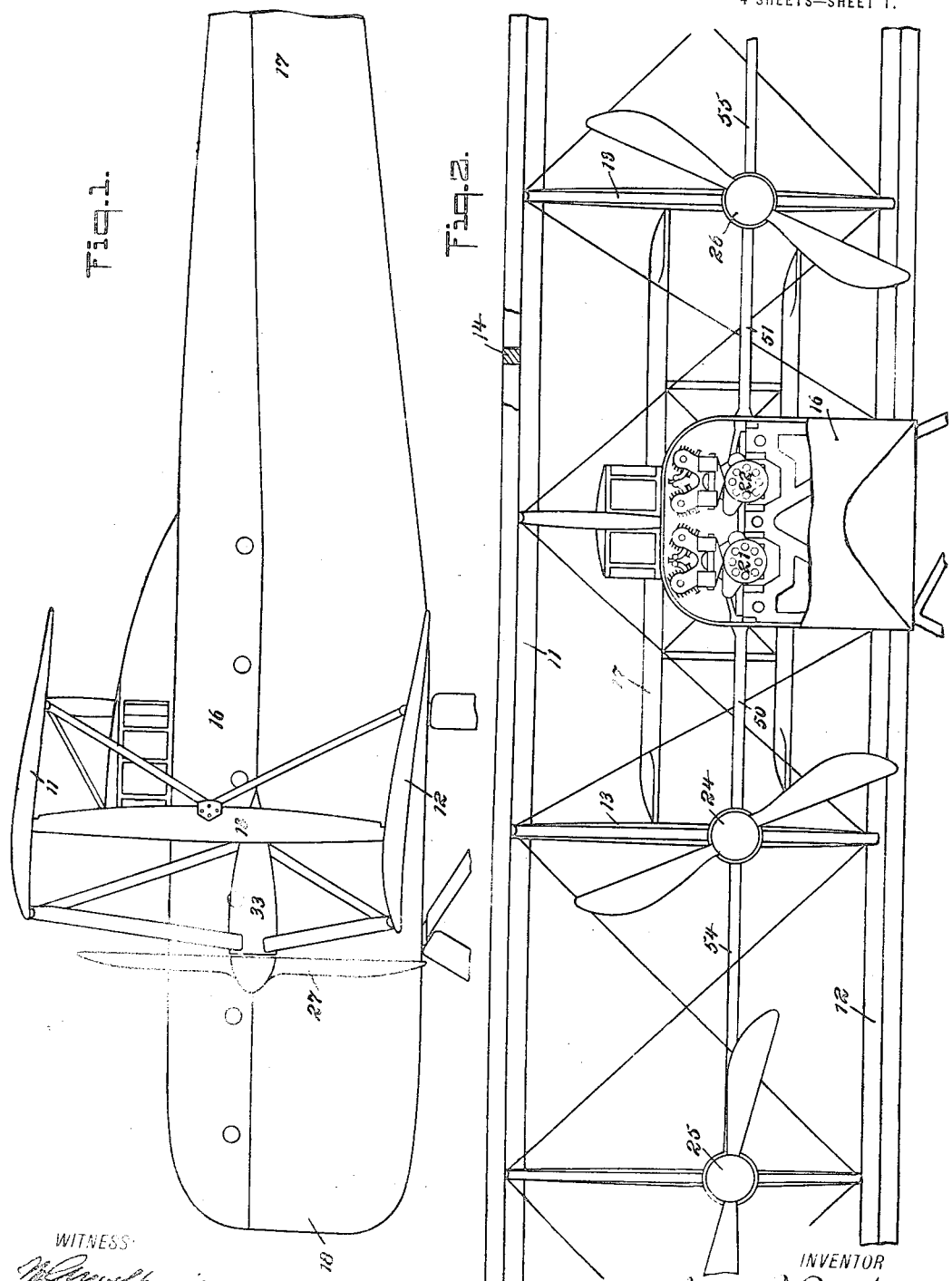

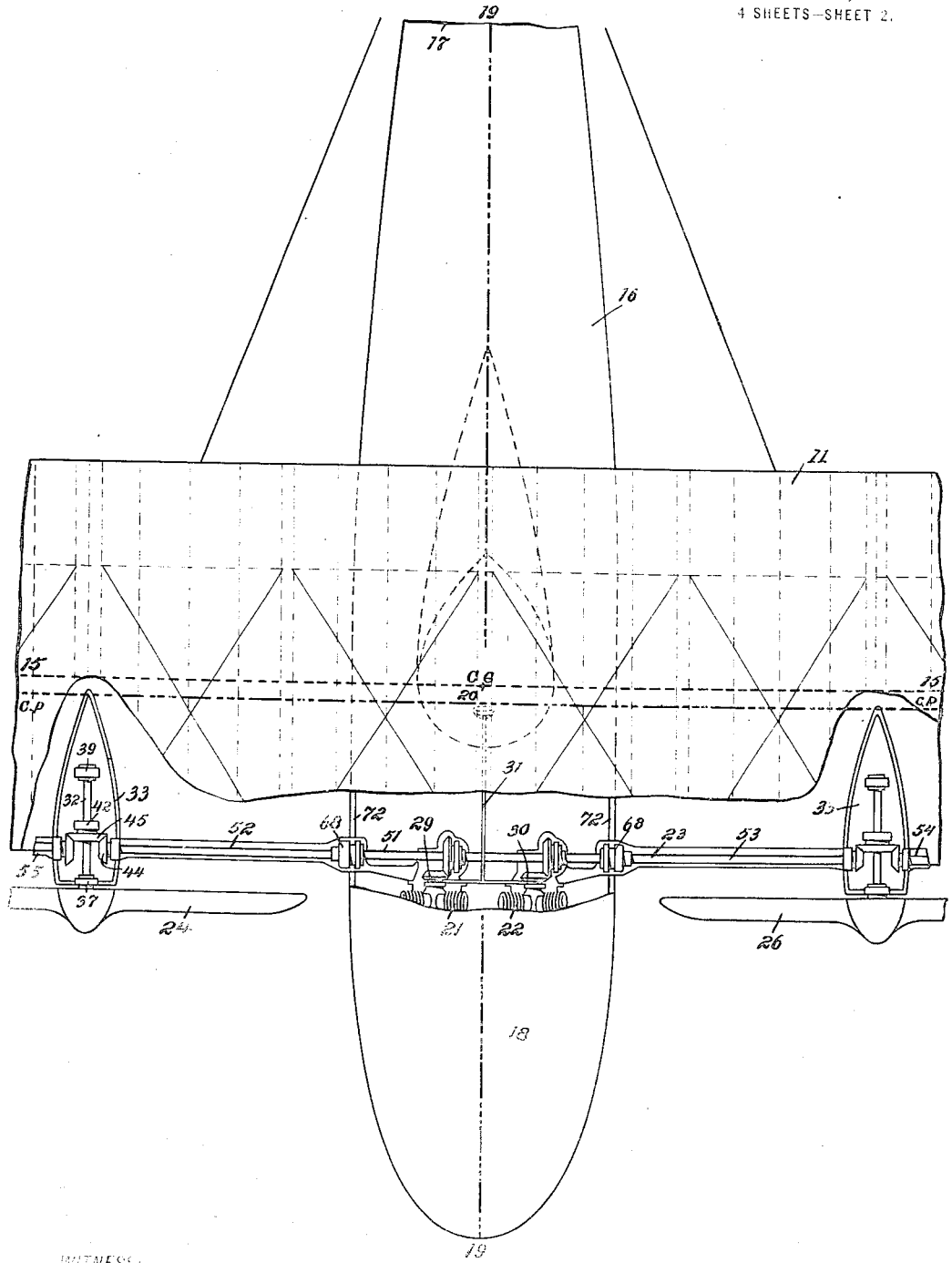

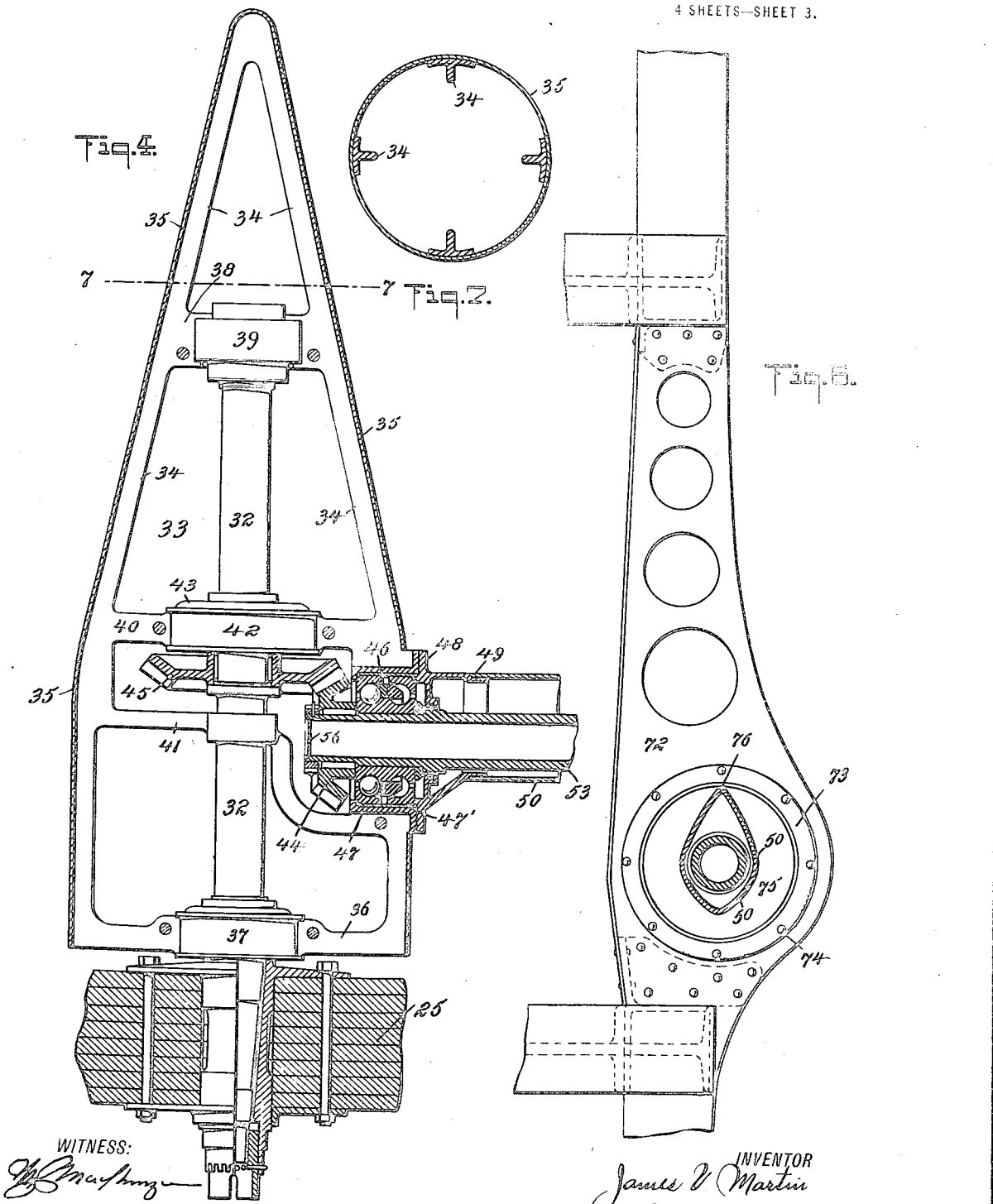

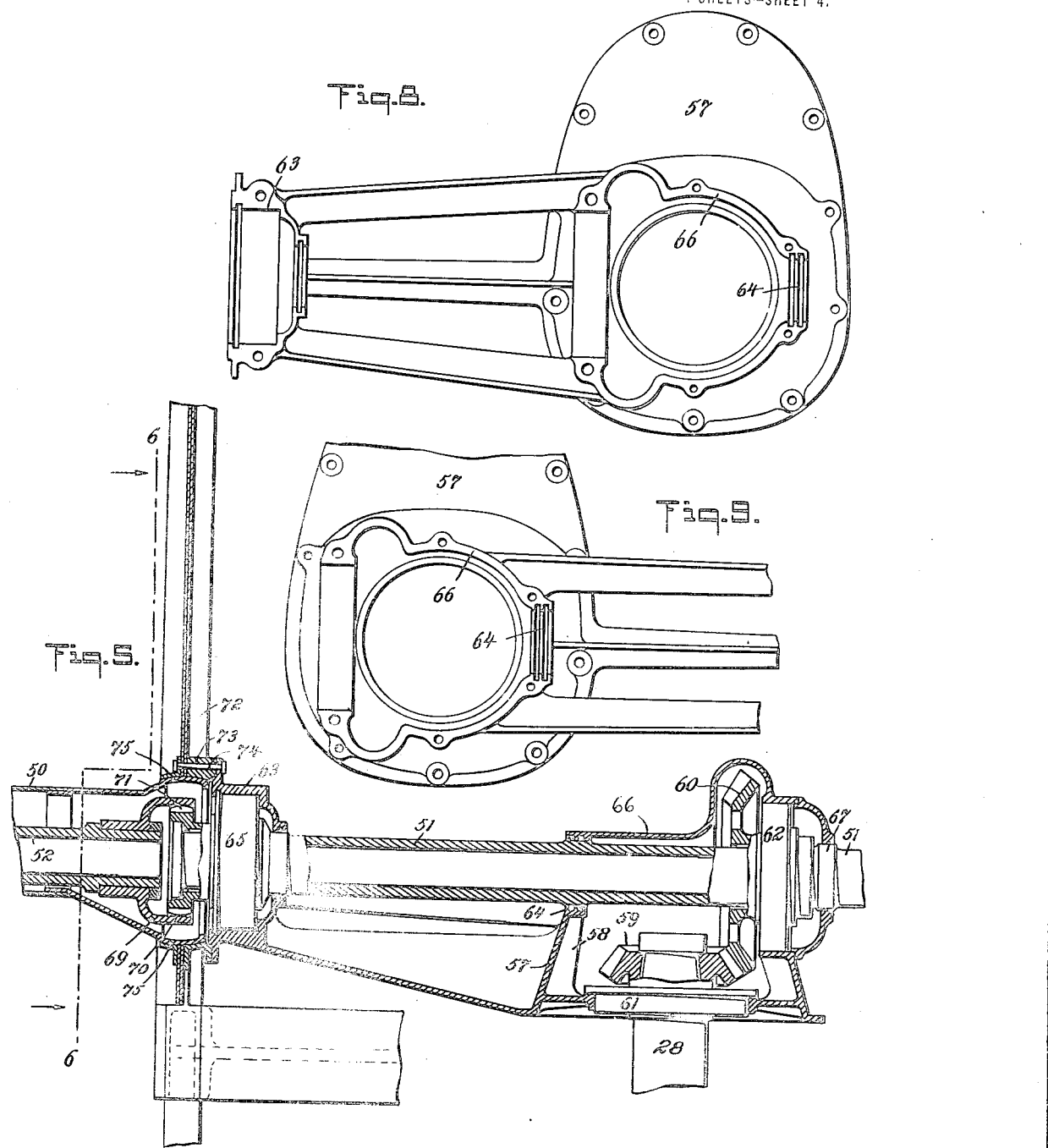

JAMES V. MARTIN, OF ELYRIA, OHIO.

TRACTOR BIPLANE.

1,421,803.  Specification of Letters Patent.  Patented July 4, 1922.

Application filed May 26, 1917, Serial No. 171,102. Renewed November 18, 1921. Serial No. 516,246.

*To all whom it may concern:*

Be it known that I, JAMES V. MARTIN, a citizen of the United States, and resident of Elyria, in the county of Lorraine and State of Ohio, have invented certain new and useful Improvements in Tractor Biplanes, of which the following is a specification.

My invention relates in general to the organization of an aeroplane construction together with its driving power plant and specifically relates to the construction and location of the prime movers and tractor screws in an areoplane cellule of the tractor biplane cruiser type.

The primary object of the invention is to provide a simple form of aeroplane of the class described which will possess increase of speed and ease of control over such devices now known while maintaining a high degree of safety.

This object is broadly attained, first, by minimizing structural resistances and second, by increasing the efficiency of the traction effort of the power plant on the machine.

Incidental to the first feature, an object of the invention is to provide a power plant which can be designed and assembled in the cellule structure in such a way that it will tend to contribute to the areo-dynamically perfected disposition of the machine parts and disposed so that it will offer a minimum increment of structural resistance.

I attain this object in general by mounting structurally heavy parts of the power plant as close as is possible to the intersection of the longitudinal and transverse axes of the machine thus to avoid the presence of inertia distorting moments during flight and, incidentally, providing convenient access to the prime movers. Further by stream lining all possible parts exposed to the air line resistances the propelling efficiency of the machine is increased.

Another object of the invention is to provide a simple form of power plant in which the prime movers are utilized as a factor of the balancing gravity moment arm in advance of the loci of the centers of pressure on the machine so as to minimize the structural length of this arm and thus reduce the length of a part which cannot contribute materially to the propelling efficiency of the machine.

Incidental to the second feature, an object of the invention is to provide a simple organization of motors, more powerful than are usually utilized in devices of this character and designed to be coupled selectively to the tractor screw transmission, so as to utilize the accumulated power from any number of motors carried to drive a plurality of tractor screws disposed to obtain their most economic propelling effect on the machine.

Incidental to the desideratum for a high safety factor in such devices, it is a further object of the invention to provide a unitary drive for maintaining a simultaneous operation of all of the tractor screws as long as there is any available prime mover in active operation.

Another object incidental to the safety feature is to provide a reinforced mounting for the transmission which will be self-contained and so designed and assembled in the machine that bending moments will not be transmitted to the struts of the cellule by stresses on the transmission.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view in side elevation of a biplane with parts shown largely in diagram, showing a preferred embodiment of my invention associated therewith and with the tail portion broken away;

Figure 2 is a fragmentary view in front elevation of the device shown in Figure 1 and with certain parts broken away to show internal construction;

Figure 3 is a plan view of the parts shown in Figure 2;

Figure 4 is a horizontal sectional view through one of the outer propeller shaft mounting and outer end of the power transmission;

Figure 5 is a similar view of a part of the power transmission within the fuselage;

Figure 6 is a longitudinal sectional view taken on the line 6—6 of Figure 5;

Figure 7 is a transverse sectional view through the rear end of the propeller shaft mounting and taken on the line 7—7 of Figure 4; and Figures 8 and 9 are fragmentary views respectively of the left and right hand motor casings.

In the following description and in the claims, parts will be identified by specific names for convenience of expression but they are intended to be as generic in their application to similar parts as the art will permit.

In the drawings there is shown a biplane construction formed largely of conventional parts and including a main cellule formed of a pair of superposed planes 11 and 12 connected by vertical K strut bracings 13 constituting the pressure struts and each plane containing K braces 14 constituting the drift trusses. The transverse axis of the machine is indicated in Figure 3 by the line 15—15 and is disposed slightly in rear of the line c. p. which indicates approximately the loci of the centers of pressures on the machine. There is also shown a longitudinally extending fuselage 16 projecting rearwardly of the cellule towards the tail 17 and projecting forwardly of the cellule for a relatively short distance to form the outlines of the motor support 18. The longitudinal axis of the machine is indicated by the line 19—19 in Figure 3 which is approximately the loci of the lines of thrust on the machine. The inter-section 20 of the lines 15—15 and 19—19 will hereinafter be referred to as the center of gravity of the machine.

A power plant is mounted on this biplane construction so as to be independent thereof except that the construction supports the power plant. The power plant includes two motors 21 and 22 and a transmission system including a main transmission shaft 23 leading laterally of the motors in one direction to the tractor screws 24 and 25 on one side of the fuselage and in the opposite direction to the tractor screws 26 and 27 on the opposite side of the fuselage.

These tractor screws are disposed in advance of the cellule and are positioned as close together as is convenient, taking into consideration the disadvantage of creating interference. The pair of motors are positioned parallel to each other in the fuselage, in advance of the center of gravity of the machine and balanced on opposite sides of the longitudinal axis 19—19.

Each of the motors is provided with a rearwardly extending power shaft 28 operatively connected to drive the transversely extending transmission shaft 23 which is placed parallel to and is disposed approximately in the plane which contains the front edges of the cellule, as shown in Figure 3. The connections between the main shaft and the motors are controlled selectively by clutches 29 and 30 actuated by control levers 31 so connected that either or both of the motors may be coupled at will to provide a driving connection with the main shaft.

As each of the tractor screws and their correlated parts are similar in construction a detailed description of any one will be sufficient for all. Each of the tractor screws is fixedly connected to the forward end of a longitudinally extending propeller shaft 32 mounted axially within a supporting housing 33 designed to provide a stream line effect. The hub of each tractor screw is stream lined, forms a complementary part of and coacts with the housing 33 to provide a structure which is particularly designed so as to offer the least possible resistance to the propulsion of the machine and at the same time provide a structure sufficiently rugged to provide a firm support for the propeller shaft and to maintain a light weight construction to the necessary parts. For this reason the housing includes a steel skeleton frame and is formed of four T-bar ribs 34 converging towards the rear of the cellule and encased within covering sheeting 35, as shown in Figure 7. The frame is internally braced by three longitudinally spaced integral wall structures. The front structure constitutes a spider frame 36 which terminates abruptly adjacent the hub of the tractor screws and carries at its center an anti-friction bearing 37 for supporting the portion of the propeller shaft immediately in rear of the tractor screw. A rear wall structure 38 is positioned adjacent the converged end of the frame and carries an anti-friction end thrust bearing 39, for supporting and steadying the rear end of the propeller shaft. The frame is provided centrally thereof with an intermediate gear housing structure consisting of a wall 40 disposed immediately in rear of the engagement of the main shaft with the propeller shaft and a front wall 41 positioned in advance of the main shaft. The wall 40 constitutes a support for an anti-friction bearing 42 supporting the propeller shaft intermediate its ends. All of these bearings are of the roller ball-bearing type with the parts thereof enclosed within cup shaped shells 43 designed so that the movable parts are at all times maintained in a bath of lubricant.

The driving connection between the main shaft and the propeller shaft is provided by a pair of meshed mitered gears, one of which gears 44 is keyed to the adjacent end of the main shaft and the other gear 45 is similarly keyed to the propeller shaft. This form of connection permits some vertical articulation of the propeller shaft housing and its supporting parts relative to the adjacent portion of the planes while maintaining the positive driving connection provided by meshed gears. The end of the main shaft provided with the gear is mounted in an anti-friction bearing 46 carried by the frame 33. The adjacent parts of the walls 40 and 41 are enlarged to provide an integral barrel 47 for the purpose of supporting the bearing 46. The bearing includes a housing 47' therefor provided with a plate 48 surrounding the main shaft and constituting an outer wall to the lubricant casing which includes the walls 40 and 41 and sheeting 35. The plate 48 is provided with a tubular extension 49 constituting a means, in the case of the inner frames supporting the screws 24 and 26, designed to support a stream line casing 50, hereinafter more fully described. 50 may be a lifting wing or aerofoil.

In an aeroplane construction it is of mechanical advantage to maintain the power transmission in as near a straight line as possible. However, in aeroplanes of the type illustrated it is usual, and preferable, that the planes be permitted to have some vertical play relative to the fuselage but the axes of rotation of the propellers must be fixed against relative movement to or from the fuselage, otherwise disastrous weaving will take place. In other words it is desired that the housing 33 be of a construction so rigid that the axis of the propelling shaft be fixed against longitudinal movement, also that it be fixed relative to the fuselage so that there will be little, if any, play horizontally between the fuselage and the axes of the propeller shaft and at the same time there should be a certain degree of flexibility in the power transmssion so as to permit the desired flexure of the planes relative to the fuselage. For this purpose the power shaft 23 is formed of a plurality of separated sections. In the device illustrated the shaft consists of a central, fuselage section 51, confined within the outlines of the fuselage, as shown in Figure 3, and intermediate plane sections 52 and 53. In those cases where more than two traction screws are used, additional outer sections 54 and 55 are used to prolong the plane sections 52 and 53. For the purpose of maintaining lightness and at the same time to provide the necessary torsional strength the shafts are made of cold drawn tubular steel and the ends thereof opening into the several lubricant containing casings are closed by means of end caps 56.

The motors are connected to the fuselage section 51 by means of a permanently meshed geared connection. As each of these connections are similar in construction, a detailed description of either one will suffice for both. The motor casing 57 is extended rearwardly to provide a gear casing 58 which contains two meshing gears, one gear 59 keyed to the motor shaft and the other gear 60 keyed to the center section 51. The gears are rotatably mounted in the casing by means of an anti-friction bearing 61 for the motor shaft gear and a similar bearing 62 for the main shaft gear. The section 51 is not only supported by the bearing 62 but a portion of the motor casing is extended outwardly from the motor to provide an outbearing support 63 and an intermediate support 64 for the section 51. The outbearing support 63 is in the form of a barrel and carries an anti-friction bearing 65 journalling the section 51 adjacent its outer end. The support 64 constitutes one side of a lubricant casing 66 containing the gears 59 and 60 and their coacting journals. The section 51 is passed through the casing and through stuffing boxes 67 carried by the casing.

Each end of the fuselage portion 50 of the main shaft is connected to the adjacent section 52 and 53 by means of a universal joint 68 so arranged that the axis of the section 52 or 53 may shift slightly from the relatively fixed axis of rotation of the section 51. For this purpose each of the joints includes a spur gear driving coupling formed of a cup member 69, constituting an external gear and telescoping a coacting internal spur gear 70. The teeth 71 of the gears are rounded as shown in Fig. 5, so that a relative rocking movement may be permitted the gears while in meshed driving position. The gear 70 is fixed to the end of the section 51 and preferably positioned within the anti-friction bearing 65. Throughout this construction the anti-friction bearings are positioned as close to the load as possible.

By this construction of coupling it is possible for the portions of the plane carrying the propeller shafts to have a slight vertical articulation but as any such movement is merely over a relatively small angle, the desired straight driving effect of a shaft type of transmission is maintained with relatively small transmission losses. The motor casing extension carrying the support 63 is bolted to the adjacent fuselage steel girder 72 and is provided with a two-part ring shell 73 fastened to the girder by bolts 74 and constituting a socket for containing the bulbular end 75 of the outwardly extending stream line casing 50. The stream line casing 50 on opposite sides of the fuselage contains the plane section 52 and 53 of the transmission shaft and is of a general egg shape in cross-section with the small side 76 positioned rearwardly of the shaft as shown in Figure 6 and otherwise conforming to conventional stream line constructions.

By this construction it is possible for the stream line casing to partake of the movement of the shaft sections contained therein and at the same time constitute a rigid spacing means for maintaining the propeller shaft housings 33 spaced a constant distance from the fuselage without interfering with the vertical articulations of the frame 33 and without materially effecting a warping movement of the portion of the plane carrying the housings about a vertical axis passing therethrough.

Further this stream line casing has the effect of securely tying the cellule portions of the aeroplane to the fuselage without materially increasing the drifting resistance and at the same time diminishing the resistance which would otherwise be offered by exposing the portions of the transmission shaft exteriorly of the fuselage.

The cellule construction herein illustrated is complete in itself with all of the necessary struts and bracings necessary to a device of this character and the power plant is also self-contained so that any wreckage of the power plant will have its minimum effect on the aeroplane and will permit the aeroplane to be controlled and landed even without the assistance of a power plant.

By means of a device of this character it is possible to mount a plurality of the highest horse power engines now used on devices of this character such as the usual twelve cylinder engines and so coupled to these engines that an accumulated horse-power is attained, which has heretofore been impossible due primarily to the inefficiency of coupling transmissions heretofore known. The transmission of such high power requires the use of relatively rugged parts which are provided in the device disclosed and at the same time the lightest possible weight of parts are utilized. As there is a maximum dimension and pitch which can be utilized efficiently with known types of tractor screws, this device multiplies the number of screws but so positions these screws that they are positioned as close together as possible to avoid interference and also to economize in length of transmission mechanism. Another factor which has improved the driving efficiency of the device disclosed is to so couple the engine with the transmission that the inner propellers travel towards each other, that is from their upper point downwardly and inwardly and in one actuation of the device the right hand propeller moves anti-clock-wise and the left hand propeller moves clock-wise.

Having thus described my invention, I claim:

1. In a device of the class described, the combination with a motive power element and a tractor screw, a mounting for the tractor screw capable of slight movement relative to the power element, of a series of rigid shafts connecting said element to drive said screw, driving gear couplings between adjacent ends of certain of said shafts to permit relative movement of the axes of said adjacent shafts while maintaining a driving connection therethrough and enclosures for certain of said shafts, said enclosures extending from front to rear of the device to provide stream line effects and means for flexibly connecting adjacent enclosures.

2. In a device of the class described, the combination with a motive power element and a tractor screw, a mounting for the tractor screw capable of slight movement relative to the power element, a transmission for connecting said power element with said tractor screw, said transmission provided with a main shaft including two sections, means for fixing the axis of one of said sections relative to the power element, a coupling for connecting said sections and for permitting relative movement between the sections while maintaining a driving connection, and a stream line casing for enclosing a part of the shaft, said casing constituting a spacing means for spacing the tractor screw mounting from the power element.

3. In a device of the class described, the combination with a motive power element and a tractor screw, a mounting for the tractor screw capable of slight movement relative to the power element, a transmission for connecting said power element with said tractor screw, said transmission provided with a main shaft including two sections, means for fixing the axis of one of said sections relative to the power element, a coupling for connecting said sections and for permitting relative movement between the sections while maintaining a driving connection, and a stream line casing for enclosing a part of the shaft, portions of said casing being coupled together to permit relative movement of said portions.

4. In an aeroplane, the combination with a fuselage having a pair of longitudinally extending girders transversely spaced apart, a power unit including a plurality of motor casings mounted within said fuselage, each of said motor casings provided with an extension fixed to its adjacent girder, a transmission shaft having opposite ends journalled in the extensions at the girders and said casings coacting to tie the girders together.

5. In an aeroplane, the combination of a propeller mounting including an enclosed ribbed construction constituting an internally braced housing having relatively large cross-sectional area at its front end and reducing in cross-sectional area towards its rear end to provide a stream-line effect, a propeller shaft extending axially of said housing, a plurality of walls formed integral with said housing, a plurality of bearings for journalling said shaft within said housing, and a tractor screw fixed to said shaft in advance of said housing, one of said bearings mounted in one of said walls adjacent the rear end of the shaft and constituting an end thrust bearing.

6. In a device of the class described, the combination with a motive power element and a tractor screw, a mounting for the tractor screw capable of slight movement relative to the power element, a transmission for connecting said power element with said tractor screw, said transmission provided with a main shaft including two sections, means for fixing the axis of one of said sections relative to the power element, a coupling for connecting said sections and for permitting relative movement between the sections while maintaining a driving connection, a casing for enclosing a part of the shaft and means for pivotally mounting said casing so that it may partake of the motion of the portion of the shaft enclosed thereby.

7. In an aeroplane, the combination with a cellule construction and a fuselage including a girder, a tractor shaft carried by the cellule and free to move therewith relative to the fuselage, a motor carried by the fuselage, a transmission system connecting the motor and shaft, said system including a plurality of shafts, means flexibly connecting the shafts, a bearing for one of the shafts fixed to the girder to steady the rotation of the system adjacent one of the flexible connecting means, a casing enclosing a portion of the transmission system exteriorly of the fuselage and means for flexibly connecting said casing to said girder.

8. In a device of the class described, the combination of a frame cellule including a power shaft supporting part, a propeller shaft supporting part capable of slight movement relative to the power shaft supporting part, a casing distinct from the cellule and constituting a means for maintaining parts of the frame in spaced apart relation, a motor supporting part distinct from the cellule, a motor mounted on said part and a flexible connection for driving the propeller shaft from the motor, a part of said connection being supported in said power shaft supporting part.

9. In a device of the class described, the combination with a motor supporting part, a cellule including a power shaft supporting part, and a propeller shaft supporting part capable of slight movement relative to the power shaft supporting part, of a power plant constituting a self contained unit distinct from the cellule and including means for maintaining said parts in spaced apart relation, a motor maintained on said motor supporting part, a propeller shaft mounted on said propeller shaft supporting part, and a flexible driving connection for driving the propeller from the motor, said connection including an organization of shafts coupled together.

10. In a device of the class described, the combination with a cellule including a power shaft supporting part and a propeller shaft supporting part capable of slight movement relative to the power supporting part, of a fuselage, a power plant constituting a self-contained-unit structurally distinct from the cellule, a motor maintained on said fuselage, a propeller shaft mounted on said propeller shaft supporting part, a flexible driving connection carried by said shaft supporting part for driving the propeller from the motor and a flexible stream line casing for enclosing the flexible driving connection.

11. In an aeroplane, a propeller shaft housing including a skeleton frame formed of longitudinally extending members, more than two internal walls connecting said members for bracing said frame, certain parts of said walls coacting to form a lubricant casing, shaft bearings for the propeller shaft mounted in said walls and a gear drive for the shaft mounted within said lubricant casing.

12. In a device of the class described, the combination of a plane, a main driving shaft disposed substantially in the vertical plane of the front edges of the plane, propeller shafts operatively connected to the main shaft to be driven thereby, propellers on the front ends of said shafts, a pair of motors disposed parallel to each other and both positioned in advance of the leading edge of the plane, each of said motors provided with rearwardly extending shafts and manually actuated means operable from a position in rear of the main shaft for connecting at will one or both motor shafts selectively to the main shaft.

13. In a device of the class described, a power plant including a plurality of motors, a line shaft transmission system including a centrally disposed main shaft, a pair of transversely spaced apart propeller shafts and an intermediate shaft between each end of the main shaft and the adjacent propeller shaft, a flexible connection between the main shaft and each intermediate shaft, a plurality of power generators disposed on one side of said main shaft and manually actuated selective means for connecting any member of said power generators to said main shaft.

14. In an aeroplane, the combination of a propeller shaft, a reduction gear in driving relation to the shaft, a stream-lined housing for supporting said shaft and gear, said housing formed in part of angle braces and provided with lubricant containing compartments supported by said braces and enclosing said gear, said housing including a forward part defining the most advanced part of the propeller shaft and a rear part forming a relatively fixed part.

Signed at New York, in the county of New York, and State of New York, this 12th day of May, A. D. 1917.

JAMES V. MARTIN.